Feb. 7, 1956 A. TURAK 2,733,731
FLOW-RATE CONTROL DISPENSING VALVE
Filed June 16, 1950

INVENTOR.
ANTHONY TURAK
BY Woodling and Krost
attys

# United States Patent Office 2,733,731
Patented Feb. 7, 1956

2,733,731

FLOW-RATE CONTROL DISPENSING VALVE

Anthony Turak, Cleveland, Ohio

Application June 16, 1950, Serial No. 168,628

2 Claims. (Cl. 137—597)

This invention relates generally to valve structures, and relates specifically to a dispensing and mixing valve for sirup concentrates and carbonated water.

An object of this invention is to provide a dispensing and mixing valve for two or more different kinds of soft drinks, or plain carbonated water.

Another object of this invention is to provide a valve structure which has a primary on-off control, and a flow control to determine the ratio of fluid dispensed when the primary control is opened.

Other objects and a fuller understanding of the invention may be had by referring to the following description and claims, taken in conjunction with the accompanying drawings, in which:

Figure 1:
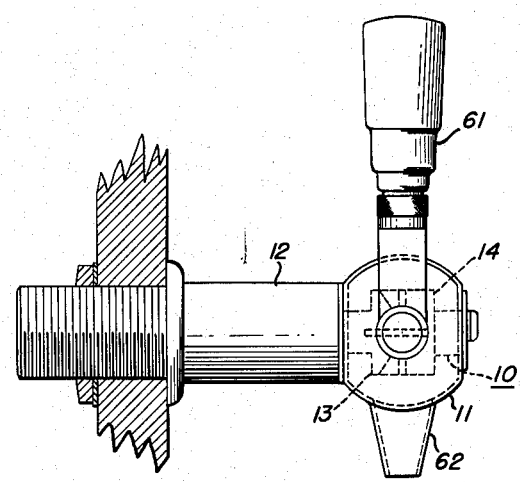
Figure 1 is a side elevation of a valve structure incorporating the features of this invention.

The drawing illustrates a tested serviceable mixing and dispensing valve made according to the principles of this invention. This valve comprises a valve body 10 positioned within a casing 11. A tubular mounting 12 is provided to support the valve upon a convenient wall or cabinet.

Figure 5:
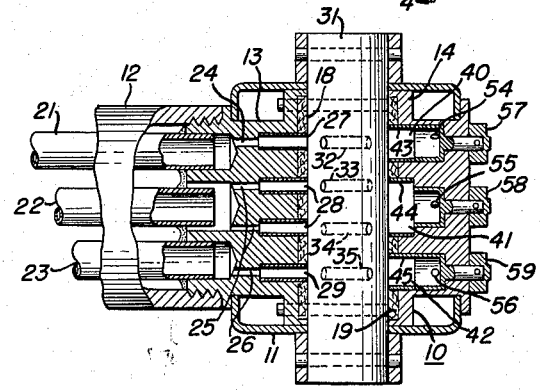
Figure 5 is a sectional view taken along line 5—5 of Figure 3.

The valve body 10, in this embodiment of the invention, includes a body section 13 and a body section 14. Section 13 has a cylindrical concave surface 16, and section 14 has a cylindrical concave surface 17. The two sections 13 and 14 are held as an operative unit by bolts 15. Three conduits 21, 22 and 23 lead into the valve body 10. These conduits may be of any conventional type, and are welded into permanent union with the body section 13. Bores 24, 25 and 26 are provided through the body section 13 from the conduits 21, 22 and 23, respectively. There are two bores 25 leading from conduit 22, as best illustrated in Figure 5 of the drawing, whereas only one bore 24 leads from the conduit 21, and one bore 26 leads from the conduit 23.

This dispensing and mixing valve structure is normally employed for dispensing cola and ginger ale drinks and soda water in taverns. Taverns desire to have small glasses of either cola or ginger ale soft drinks, and sometimes just plain soda water is preferred. Accordingly, conduit 21 may be attached to a pressurized supply of cola concentrate sirup, and conduit 23 may likewise be attached to a pressurized ginger ale sirup concentrate source. The conduit 22 will be attached to a pressurized source of carbonated water. Being under pressure, each of the fluids will tend to flow through the bores 24, 25 and 26 without restraint. Accordingly, a valve mechanism is employed to control the flow of the fluid through the four bores. The illustrated embodiment employs a cylindrical valve rod 31. The valve rod 31 is clamped in close-fitting relationship between the cylindrical surfaces 16 and 17. In order to prevent seepage of the fluids which are under pressure, suitable packing washers 18 and 19 are provided to line the surfaces 16 and 17. It has been found that semicircular washers like the packing washers 18 and 19 are difficult to maintain in correct position in a valve structure of this type, and accordingly this problem has been solved by providing tubes 27, 28 and 29 for each of the bores 24, 25 and 26, respectively. The tubes extend through the packing 18 and into the respective bores. The projecting ends of the tubes therefore maintain the packing in correct angular position.

Figure 2:
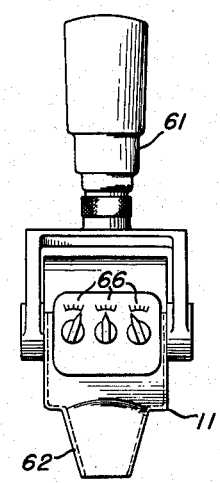
Figure 2 is a front view of the valve.
Figure 3:
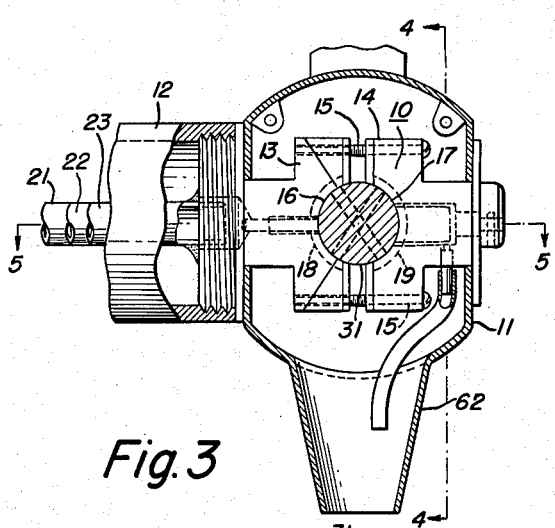
Figure 3 is an enlarged side view of the valve with the side casing broken away.

The cylindrical valve rod 31 is provided with a plurality of passageways therethrough to conduct fluid from each of the bores through the body section 13. In the illustrated embodiment, there are four passageways 32, 33, 34 and 35. The passageways 32 and 33 are aligned angularly with respect to one another, and the passageways 34 and 35 are likewise aligned angularly with respect to one another. However, the two passageways 32 and 33 are angularly rotated with respect to the two passageways 34 and 35. Accordingly, the entrance ends and the exhaust ends of the two sets of passageways are angularly displaced along the surface of the valve rod 31. A handle 61 is provided as best illustrated in Figures 1 and 2, to rotate the cylindrical valve rod about its longitudinal axis. Therefore, movement of the handle 61 to the left of the neutral position illustrated in Figure 1 will position the entrance ends of the passageways 32 and 33 in registration with the conduit 24 and one of the conduits 25. Likewise, movement of the handle 61 to the right of the position illustrated in Figure 1 will bring the entrance ends of the passageways 35 and 34 into registration with the bore 26 and the other of the bores 25, respectively. Movement of the handle 61 to the neutral position of Figure 1 will take all of the passageways out of registration with the bores, and accordingly prevent the flow of fluid through the valve rod 31. It is now apparent that if the conduit 21 is connected to a source of cola sirup concentrate and the conduit 22 is connected with a source of carbonated water, movement of the handle 61 to the left of the position illustrated in Figure 1 will dispense a mixture of cola sirup and soda water. Likewise, movement to the right of the handle 61 will dispense a mixture of ginger ale sirup and soda water.

In the body section 14, receiving chambers 40, 41 and 42 are provided to receive the flow of fluid through the passageways in the valve rod 31. In a manner similar to that described with reference to the packing washer 18, the packing washer 19 is held in nonrotative position by the provision of tubes 43, 44 and 45 which extend from the receiving chambers through the packing.

Figure 4:
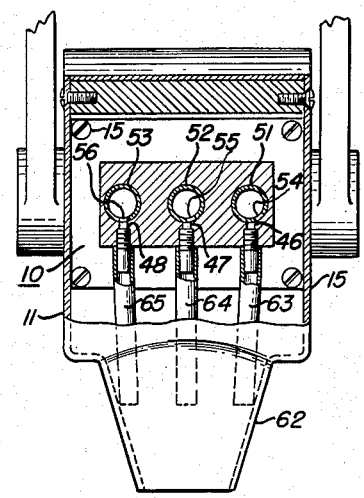
Figure 4 is a sectional view taken along line 4—4 of Figure 3.

As thus far described, the valve mechanism of this invention is operative to dispense one of two types of drink mixtures from the same dispensing valve. A valve mechanism is provided to turn either of the sources on and off, or to stop the flow of fluid through the valve entirely. However, it has been found in actual operation that the pressure available upon each of the fluids coming through the conduits 21, 22 and 23 will vary considerably even during a one-hour period, if the use of the fluid is of any extent. Accordingly, this invention provides not only an on-off valve control 31, but has the further provision of a flow-rate control. The flow-rate control of this invention is adjustable from the external surface of the valve, without dismantling the valve in any degree. The receiving chambers 40, 41 and 42 are provided with orifices 46, 47 and 48, as best illustrated in the Figure 4 of the drawing. Sleeves 51, 52 and 53 are closely fitted into the receiving chambers, and each of the sleeves is provided with an opening 54, 55 and 56, respectively. Handles 57, 58 and 59 are provided for manual rotation of the sleeves within the receiving chambers. Accordingly, the sleeves may be rotated manually to position the openings thereof into any degree of registration with the orifices from the receiving chambers, or may be rotated to completely close the orifices by taking the openings out of registration altogether. Accordingly, the flow through any of the receiving chambers may be minutely adjusted by rotation of the handles operating the sleeves 51, 52 and 53. In Figure 4 of the drawing, the sleeve 53 is in full registration; the sleeve 52 is in partial registration, and the sleeve 51 is completely rotated to close the orifice 46.

To complete the valve structure, the housing 11 is provided with a spout 62 which leads to a glass to be filled. Tubes 63, 64 and 65, preferably of a flexible material such as a suitable plastic material, are attached to the bottom of the body section 14 to conduct fluid from each of the receiving chambers down into the spout 62. Thus, the actual mixing of the fluid is accomplished in the spout 62 and in the glass receiving the fluid. Accordingly, very little of one fluid or the other will remain in the spout 62, and accordingly no carry-over or taste will be apparent when the type of drink is changed.

This improved dispensing valve, as previously explained, is capable of adjustment to control the rate of fluid flow from any of the receiving chambers, even to the extent of closing off all flow. Advantage is taken of this feature to provide a third type of drink, other than the flavored cola or ginger ale drink, namely, plain soda water. In order to dispense plain soda water one of the handles 57 or 59 is rotated to completely close off the cooperating receiving chambers. Therefore, for example, if the chamber 40 were to be closed off and the control handle 61 moved to the rearward position which would normally dispense fluid from the cola conduit 21, no fluid would flow from the chamber 40, but fluid would flow from the chamber 41 dispensing carbonated water from the conduit 22.

For convenience in determining what position a particular sleeve is in, in order to return that sleeve to the same position after closing the sleeve to obtain soda water, indicia 66 are provided on the front surface of the casing 11. These indicia 66 also aid in the original selection of positions to produce the desired concentration of sirup. Prior to this invention, adjustment of ratios of two fluids dispensed was determined by actually dispensing fluids into a measuring glass. The adjustment was made internally of the valve. This invention eliminates measurement type of adjustment, because the handles and indicia provide immediate selection once they have been graduated.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dispensing valve comprising, a first valve body having a concave surface defining a first portion of a valve socket, a second valve body having a concave surface defining a second portion of a valve socket, means holding said first and second valve bodies with the concave surfaces thereof relatively positioned to define portions of a valve plug guideway, a plurality of fluid conduits leading from the exterior of said first valve body to the concave surface thereof, a valve plug rotatably mounted in said valve plug guideway with the concave surfaces fitting fluid-tight therewith and adapted for sealing off said fluid conduits, said first and second valve bodies spaced apart and the concave surfaces defining less than a closed encompassing structure when fitted over said valve plug, said holding means urging said first and second valve bodies toward each other to hold the concave surfaces tight against the valve plug, a plurality of passageways extending laterally through said valve plug, said passageways having entrance ends angularly spaced along the surface of said valve plug in a predetermined pattern for registering a selected number of said passageway entrance ends with a selected number of said conduits in any one predetermined rotative position of said valve plug, said second valve body having a plurality of receiving chambers each positioned to register with one passageway which registers with a conduit, each chamber having an orifice exhaust passageway having an entrance opening from the side wall of the chamber and extending to the exterior of the second valve body, a cup-shaped sleeve fitting closely in each chamber, a valve opening in the side wall of each sleeve alignable with said entrance opening of the orifice exhaust passageway, and adjustment control means for each sleeve for moving said sleeve in its chamber to bring the opening thereof into a selected degree of registration with said orifice including a position fully out of registration to close said orifice.

2. A dispensing valve comprising, a first valve body having a concave surface defining a first portion of a valve socket, a second valve body having a concave surface defining a second portion of a valve socket, means holding said first and second valve bodies with the concave surfaces thereof relatively positioned to define portions of a valve plug guideway, a plurality of fluid conduits leading from the exterior of said first valve body to the concave surface thereof, a valve plug rotatably mounted in said valve plug guideway with the concave surfaces fitting fluid-tight therewith and adapted for sealing off said fluid conduits, said first and second valve bodies spaced apart and the concave surfaces defining less than a closed encompassing structure when fitted over said valve plug, said holding means urging said first and second valve bodies toward each other to hold the concave surfaces tight against the valve plug, a plurality of passageways extending laterally through said valve plug, said passageways having entrance ends angularly spaced along the surface of said valve plug in a predetermined pattern for registering a selected number of said passageway entrance ends with a selected number of said conduits in any one predetermined rotative position of said valve plug, said second valve body having a plurality of receiving chambers each positioned to register with one passageway which registers with a conduit, each chamber having an orifice exhaust passageway having an entrance opening from the side wall of the chamber and extending to the exterior of the second valve body, a valve member in each chamber, and adjustment control means for each valve member.

References Cited in the file of this patent

UNITED STATES PATENTS

| 10,641 | Ripley | Mar. 14, 1854 |
| 142,120 | Richardson | Aug. 26, 1873 |
| 667,301 | Dredge | Feb. 5, 1901 |
| 843,686 | Moffat | Feb. 12, 1907 |
| 1,661,431 | Leibing | Mar. 6, 1928 |
| 1,828,175 | Crosby | Oct. 20, 1931 |
| 2,043,982 | Bruneau | June 16, 1936 |
| 2,227,661 | Martinson | Jan. 7, 1941 |
| 2,590,535 | Harper | Mar. 25, 1952 |

FOREIGN PATENTS

| 15,374 | Great Britain | July 13, 1898 |
| 656,290 | France | May 6, 1929 |